United States Patent [19]
Hesse

[11] 4,455,728
[45] Jun. 26, 1984

[54] METHOD FOR CLAMPING TOGETHER HEAT EXCHANGER PARTS

[75] Inventor: Wolfgang Hesse, Remseck, Fed. Rep. of Germany

[73] Assignee: Sueddeutsche Kuehlerfabrik Julius Fr. Behr GmbH & Co. KG, Stuttgart, Fed. Rep. of Germany

[21] Appl. No.: 430,250

[22] Filed: Sep. 30, 1982

Related U.S. Application Data

[62] Division of Ser. No. 98,838, Nov. 30, 1979, Pat. No. 4,378,174.

[30] Foreign Application Priority Data

Dec. 4, 1978 [DE] Fed. Rep. of Germany ....... 2852415

[51] Int. Cl.$^3$ .................. B21D 53/00; B21K 29/00; B23P 15/26
[52] U.S. Cl. .................. 29/157.3 R; 29/157.4; 29/511; 29/520; 29/243.52; 29/727
[58] Field of Search ............... 29/510, 157.4, 157.3 R, 29/520, 243.52, 511, 727; 165/149, 152, 166, 167, 172; 403/153, 274, 284

[56] References Cited

U.S. PATENT DOCUMENTS

| | | | |
|---|---|---|---|
| 2,394,881 | 2/1946 | Stuhlfauth | 29/511 UX |
| 2,604,923 | 7/1952 | Schivoder, Jr. | 29/511 UX |
| 3,939,908 | 2/1976 | Chartet | 29/157.3 R |

FOREIGN PATENT DOCUMENTS 2270471 12/1975 France .................. 29/513

Primary Examiner—Charlie T. Moon
Attorney, Agent, or Firm—Schwartz, Jeffery, Schwaab, Mack, Blumenthal & Koch

[57] ABSTRACT

A method is disclosed for clamping together a first and a second part, the first part having a flange thereon, the second part having a groove which may receive the flange. The method includes the steps of placing a deformable seal on the bottom of the groove of the second part, placing the flange of the first part on the deformable seal as the flange is guided into the groove, clamping the first and second parts together while deforming the seal until the seal approximately fills a space defined between a lower surface of the flange and the walls forming the groove, and deforming certain parts of a vertically upright standing area of the second part by rolling the certain parts of the area over an upper surface of the flange into generally horizontal positions while leaving other parts of the area generally in their vertically upright condition to thereby form an approximately corrugated edge on the second part, which holds the first and second parts together in a clamped condition. A device for establishing a clamping connection in this manner is also disclosed.

1 Claim, 12 Drawing Figures

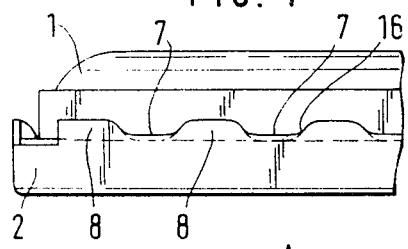
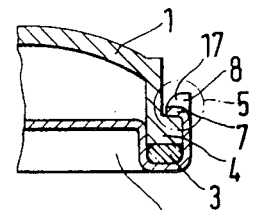
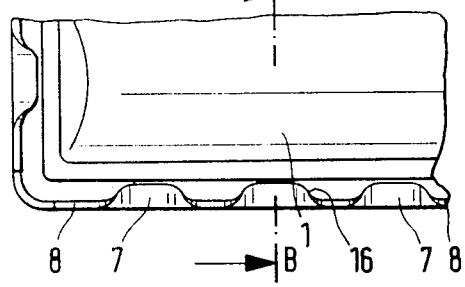
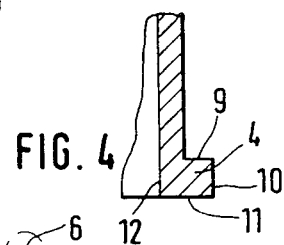
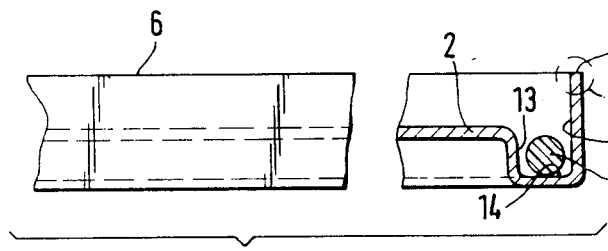
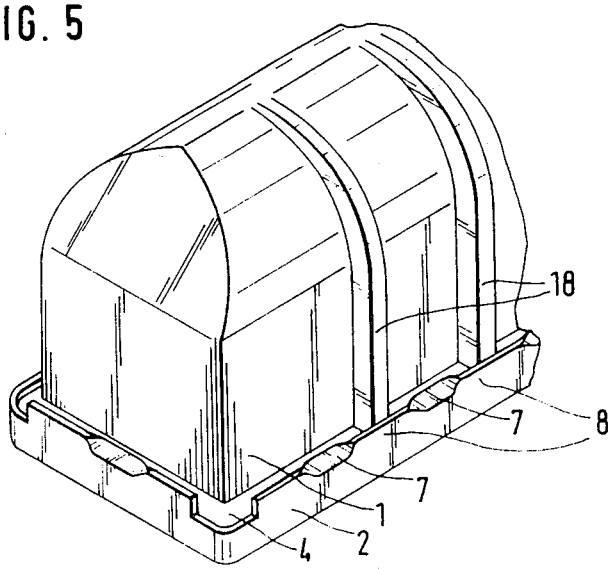

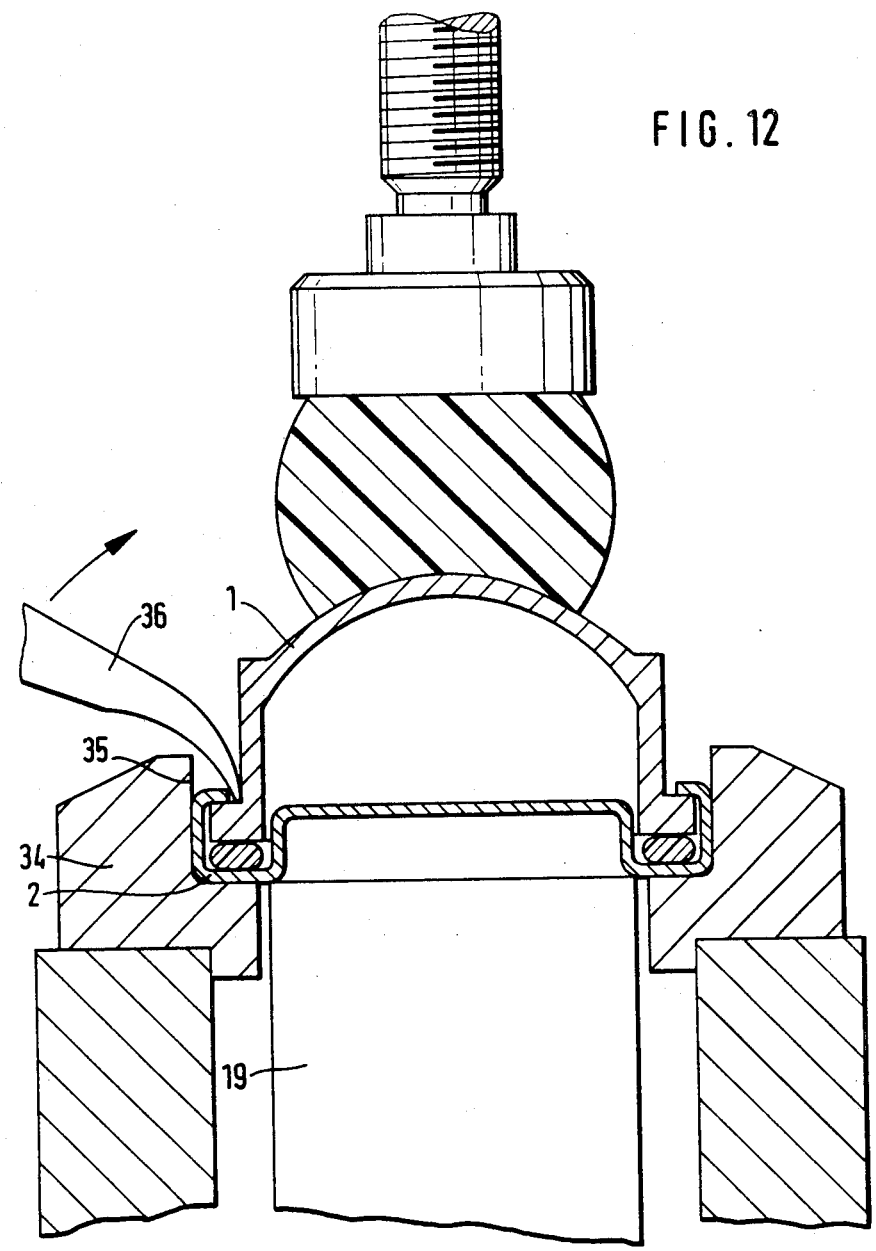

METHOD FOR CLAMPING TOGETHER HEAT EXCHANGER PARTS

This is a division of application Ser. No. 98,838, filed Nov. 30, 1979, now U.S. Pat. No. 4,378,174, issued Mar. 29, 1983.

TECHNICAL FIELD OF THE INVENTION

The invention concerns a clamping connection between a first part provided with a flange and a second part equipped with a deformable edging area, in which the edging area is positively joined with the flange and in which a deformable packing is arranged between the two parts.

DESCRIPTION OF THE PRIOR ART

Various connections of the above-mentioned type are known. These are the so-called flanging or beading joints, wherein the edging area of the bottom positively grips the flange (French Pat. No. 1,039,911, West German Utility Model 74 14 340). This type of joint is not suitable for repair purposes because, while the joint may be released, it cannot be reestablished due to the danger of breakage. Releasable beaded connections are also known (Russian Pat. No. 109,420) wherein the parts to be joined are connected with each other by means of a clamp-like, toothed, profiled strip and wherein these parts may be separated by the bending of the teeth. Such a clamp release with an additional locking strip, however, is material and labor intensive to a high degree.

SUMMARY

It is thus the object of the present invention to provide a clamping connection of the type having a deformable edge positively joined to a flange which, on the one hand, provides a secure and durable sealing of the parts to be jointed, a reduced use of material, and a simple process of production and which, on the other hand, may be separated for the purpose of repair and subsequently rejoined. It is a particular object of the invention to provide a clamping connection which may be produced simply and which is releasable even where the joined parts are relatively inaccessible.

These and other objects and advantages will become apparent from the following description and from the drawing.

The objects of the invention are achieved firstly by providing a continuous edge which represents an advantage over known designs with toothed outer edges, because the additional manufacturing step of the stamping of the teeth is eliminated. By means of the deformed and undeformed partial areas of the connection according to the present invention, a positive joint necessary for the cohesion and sealing of the two parts of the joint is attained. Further, the invention provides for undeformed, standing portions which lend additional strength to the joint. The invention also provides for a three-dimensional deformation of the edge region and a corrugated configuration associated with it. This results in elongation of the material being deformed and thus also results in work hardening, i.e., an increase in the permanent strength of the material. This leads to the possibility of reduced wall thicknesses of the material to be used, which, of course, means lower weight and a longer life of the connection of the invention. Because the undeformed partial areas, which stand vertically upward, and the deformed partial areas, which grip the flange in the form of horizontal holding surfaces, continuously pass into each other, ribs are formed between the horizontal and vertical surfaces of the edging area. These ribs provide an additional stiffening of the horizontal holding surfaces and thus a reduction in the mechanical state of stress of the joint. This again results in immediate weight advantages. Finally, there is the advantage of the simplicity in assembly through use of a simple closing tool and an equally simple separation of the joint according to the invention. This is because it is readily feasible to open the connection by gripping on the reverse side of the deformed partial areas with a simple hook-like tool. In the process, the material of the deformed border areas is not stressed or damaged to an extent that would prevent the reclosing of the connection after repairs have been completed. A further advantage of this connection resides in the fact that the forces required to close the joint are relatively low, even though a continuous, straight outer edge is used. This outer edge is deformed only over approximately one half of its length thus necessitating correspondingly lower deforming forces. These forces are not transmitted to the flange but are absorbed by the bottom.

Summarizing the foregoing in different terms, the edge of the second part is deformable from a first condition in which the edge is a continuous edge which is straight along most of its length and a second condition in which the edge has a continuously corrugated configuration including alternately deformed and undeformed partial areas. The flange and edge have an unclamped condition in which the deformable edge is in its undeformed condition and a clamped condition in which the deformable edge is in the deformed condition. The deformed partial areas positively and lockingly engage the flange when the flange and edge are in the clamped condition to thus form a positive joint. The edge includes means for stiffening the clamping connection in the remaining or clamped condition. The stiffening means includes the undeformed partial areas.

To further summarize the invention in terms of the process thereof, the invention includes the step of bringing the first and second parts together so that the flange of the first part sits within the edge of the second part. The next step is deforming the edge of the secod part from an undeformed condition in which the edge is straight along most of its edge to a deformed condition by: engaging certain partial areas of the edge with a forming tool; working certain partial areas into positive locking engagement with the flange of the first part; and leaving other partial areas of the edge, which other partial areas are alternately interposed with the certain partial areas, in an undeformed condition, so that the edge is deformed into a corrugated configuration in which the certain deformed partial areas form a positive joint and the other undeformed partial areas provide a stiffening effect.

An advantageous embodiment of the invention provides a rectangular cross section for the flange and a corresponding rectangular groove configuration for the second part to be joined. This results in a particularly simple closing process, because the partial areas which have already been preformed by the rectangular groove configuration in part remain standing and in part are formed into horizontal surfaces by simple rolling. The result is a particularly advantageous stiffening through the formation of ribs of the horizontal holding surfaces.

In a further advantageous embodiment of the invention, the parts to be joined consist of a plastic water box and a sheet metal bottom which are components of a heat exchanger. The water in the plastic water box is in contact with the bundle of tubes carried by the sheet metal bottom. Very large numbers of heat exchangers of this type are used in the automotive industry in the form of cooling devices or heaters and, there, the above-mentioned advantages are particularly significant.

In still another advantageous embodiment of the invention, an apparatus for manufacturing of the connection according to the invention is provided. This device of the invention, particularly its gripping jaws, makes it possible to establish the connection in a simple and secure manner. That is, the device makes it possible to join the bottom and the water box in a fluid tight manner and to provide an increase in the mechanical strength of the material to be deformed.

Examples of embodiments of the invention are represented in the drawing and shall be described hereinafter in more detail.

BRIEF DESCRIPTION OF THE DRAWING

FIG. 1 shows the connection according to the invention in a fragmentary front elevation;

FIG. 2 shows the connection according to the invention in fragmentary cross section;

FIG. 3 shows the connection of the invention in a plan view;

FIG. 4 shows the flange of the first part in fragmentary cross section;

FIG. 5 shows, in fragmentary elevation and in fragmentary cross section, the deformable edge area of the second part and the packing prior to the deformation;

FIG. 6 shows, in perspective, the connection according to the invention on a vehicle radiator;

FIG. 12 shows, partly in section and partly in elevation, a device to open the connection according to the invention.

DETAILED DESCRIPTION

Figure 7:
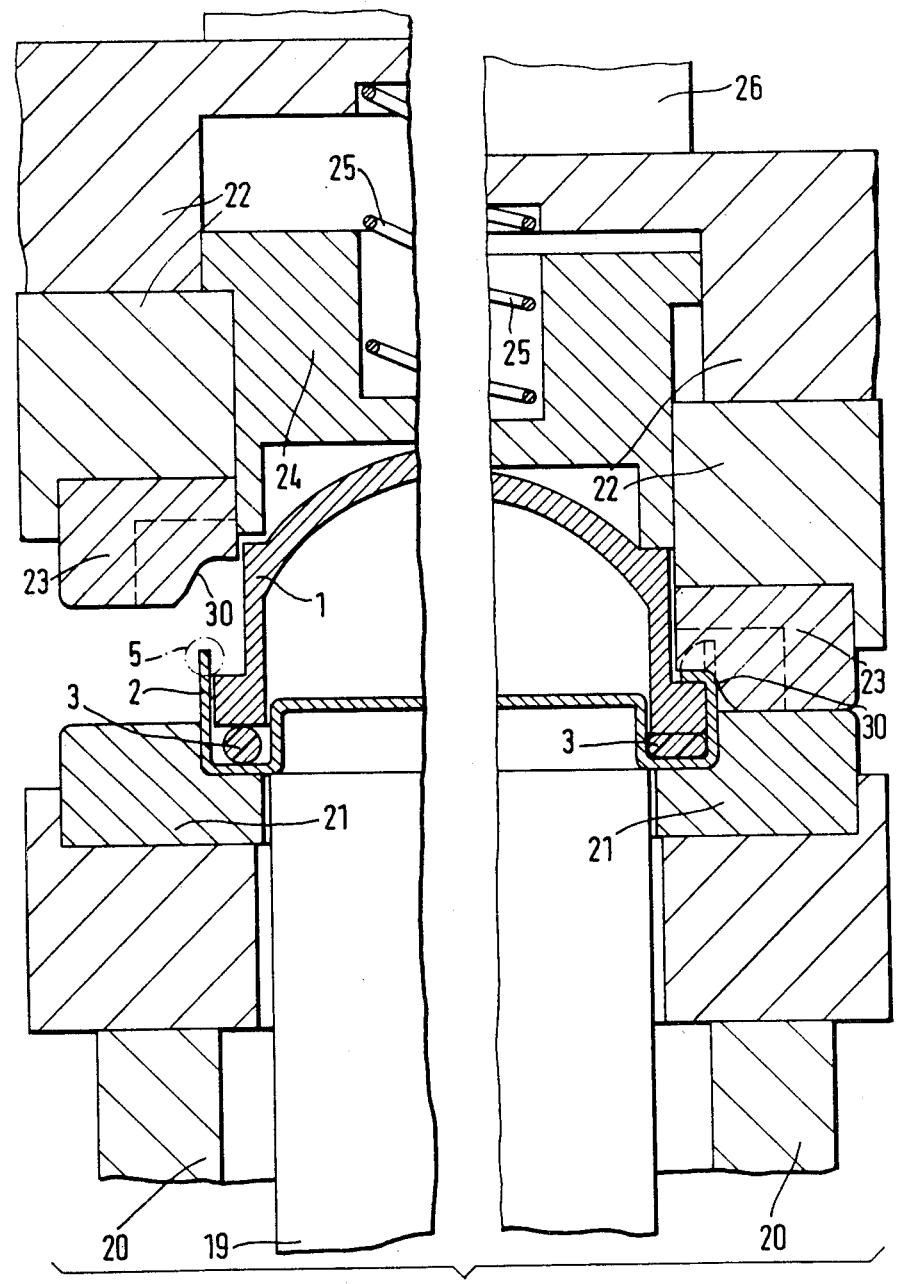
FIG. 7 shows in cross section the closing apparatus according to the invention.
Figure 8:
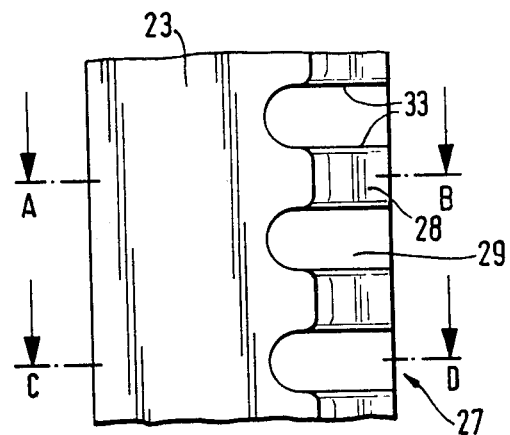
FIG. 8 shows the closing jaws according to the invention in a bottom view.
Figure 9:
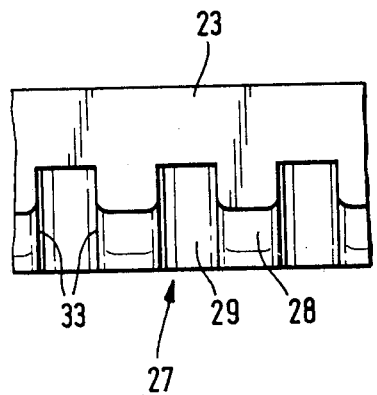
FIG. 9 shows the gripping jaws according to the invention in side elevation.
Figure 10:
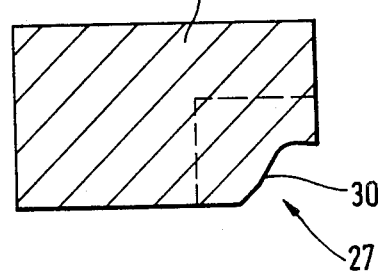
FIG. 10 shows the gripping jaw according to the invention in a cross section through a deformed section.
Figure 11:
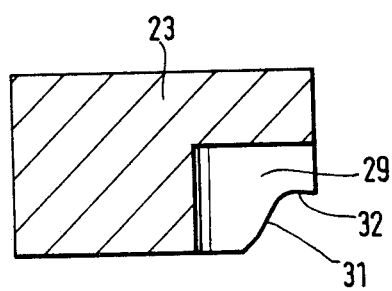
FIG. 11 shows the gripping jaw according to the invention in a cross section through a recess.

FIGS. 1, 2 and 3 show the connection of the invention in the finished, i.e., the closed, state when used in a heat exchanger application. There the water box 1 is the first part to be joined and the tube plate 2 is the second part. Parts 1 and 2 are connected with each other by means of an elastomeric packing 3 in a fluid and pressure tight manner. Both parts 1 and 2 thus form the collector vessel for the heat exchanger through which a hot, pressurized liquid medium flows. The remaining parts of the heat exchanger, i.e., tubes and ribs and a second collector vessel, are not shown in the drawing, and they correspond to the above-cited state of the art.

It follows from FIGS. 1 to 3 that the sheet metal plate 2 has a deformable edge area 5 which, in the finished joint, consists of the undeformed partial areas 8 standing upward in the vertical direction and the deformed partial areas 7 extending horizontally. The outer edge of the deformed edge area 5 has a corrugated configuration 16, whereby the line 16 proceeds not in one but in a plurality of planes between the horizontal and the vertical planes. Because the deformed partial areas 7 are located essentially in a horizontal plane and the undeformed partial areas 8 essentially in a vertical plane, the transition from the horizontal into the vertical planes results in the formation of rib-like stiffening surfaces 17, as best shown in FIG. 2. Because the collector vessels consisting of the parts 1, 2 and 3 are predominantly under a pulsating compressive stress, the joint according to the invention is also exposed to forces exerting a bending moment on the horizontal bearing surfaces in the sense that such bearing surfaces are further bent upwards on the outside. This stress is opposed by the stiffening ribs 17 of the invention which thus contribute to the strengthening of the mechanical joint while increasing its useful life.

FIGS. 4 and 5 show certain details of the two parts 1 and 2. Specifically they show, on the one hand, the flange 4 and on the other hand, the rectangular groove configuration of the plate 2 with the packing 3 inserted prior to the joining of the parts 1 and 2. It may be seen thereby that the deformed edging area 5 of the plate 2 has a continuous straight outer edge 6 and it may also be seen from the drawing (especially FIGS. 1, 3 and 16) that the flange 4 is also continuous. The flange 4 of the water box 1 has an approximately rectangular profile in its cross section, the profile being bounded essentially by the upper surface 9, the outer surface 10, the lower surface 11 resting on the packing 3, and the inner surface 12. In other words, the flange describes a generally rectangular shape and, as will be appreciated from FIGS. 2 and 7, this rectangular shape will define an open side of the water box (before, of course, it is connected to the end plate 2). It will also be see from FIGS. 2 and 7 that flange 4 of the water box extends in a direction toward the end plate 2 and that the flange 4 has a shoulder defining a surface 9 (FIG. 4) which faces away from the end plate. A mating region of part 2, which mating region takes the form of a groove, has a rectangular configuration designed to correspond to the rectangular profile of the flange 4. Such configuration or groove is defined similarly by the inner side 13, the underside 14 upon which the packing 13 rests, and the outer side or edge 15. As will be apparent from FIGS. 2 and 5, the groove has a bottom defined by underside 14, and the underside 14 extends perpendicularly between said inner side 13 and outer edge 15. It will be apparent from FIG. 2, especially when compared with FIG. 5, and from the description which follows relating to the method of making the clamped connection, that the packing is in a compressed condition between the deformed partial areas 7 and the bottom or underside 14 of the groove when the flange and edge are in the clamped condition.

FIG. 6 shows another example of application of the clamping connection of the invention, in this case for the radiator of a vehicle. The water box of this embodiment is made of plastic material and is provided with lateral ribs 18 for reinforcement. Lateral ribs 18 extend to the flange 4 thus leaving no room for the bending of the plate 2. The clamping connection according to the invention is particularly advantageous when used in connection with a water box 1 designed with ribs 18, since the deformed partial areas 7 may be placed between the ribs 18 so that the undeformed partial areas 8 are at the ribs 18.

In FIG. 7, a device for the establishment, i.e., the closing, of the clamping connection is represented in two half sections, whereby the left hand half section shows the device in the open state and the right hand half section shows the device in the closed state. The device consists of a stationary lower part 20 of the closing tool part 20, carrying a receiving jaw 21 to receive the heat exchanger. This heat exchanger 19 rests with its sheet metal bottom 2 in a corresponding recess of the receiving jaw 21. The round cord packing 3 is inserted in the groove prior to the closing of the water box 1, and the deformable edge area 5 of the plate 2 stands vertically upward. The upper part 22 of the closing tool is movable and is actuated by a press 26. That is, upper part 22 is moved downwardly to close the water box 1. Upper part 22 receives in a corresponding recess a holddown device 24 supported against upper part 22 by means of a compression spring 25. Upper part 22 also supports a closing jaw 23. The latter has an area which, during the closing movement, impacts the deformable edge area 5 of the plate 2. In this impact area the closing jaw 23 has roll shape 30 which progresses inwardly, obliquely and horizontally, respectively, to effect the partial deformation of the edge area 5. During the working cycle, i.e. during the closing process, the upper part 22 of the tool moves downwardly with its holddown device 24, which thereupon presses the water box 1 under the pressure of its spring 25 downwardly against the packing 3 which is then deformed. After the packing has been prestressed in this manner, the closing jaw 23 initially impacts the edge area 5 of the upwardly, vertically standing plate and bends such areas inwardly until the horizontal surface of the roll shape 30 grips the edge area 5 and turns it down horizontally in a manner parallel to the upper surface of the flange.

More details of the design of the closing jaw 23 may be seen in the individual FIGS. 8 to 11. Jaw 23 includes area 27 for deformation of the workpiece. Area 27 has deforming sections 28 and recesses 29 alternatively following each other. The profile of the deforming sections 28, on the one hand, and the profile of the recesses 29, on the other hand, are shown in cross section in FIGS. 10 and 11. These profiles are so dimensioned that during the downward movement, i.e. upon the impact of the closing jaw 23 with jaw 21 such that its lower edge is on the upper edge of the receiving jaw 21, the edge area 5 of the plate is not engaged, and yet the roll shape 30 completes the total deformation of the edge area 5 during its working stroke to the stop. The roll shape 30 is characterized essentially by two surfaces passing into each other. One such surface is the roll surface 31 extending obliquely from the bottom to the top, initially in a straight line and then in an arc. The other such surface is the closing surface 32 following the roll surface 31 and extending horizontally and then slightly downwardly. During the initial descent of the closing jaw 23 this configuration effects the bending of the deformable edge area 5 around the flange 4. Subsequently, this configuration effects depression of the edge area 5 into a horizontal position. The deforming surfaces of the roll shape 30 are rounded opposite the recesses 29 at their transition edges 33, so that the above-mentioned corrugated configuration 16 of the finished clamping connection is obtained after the deformation.

Finally, FIG. 12 shows a device which makes possible opening of the clamping connection according to the invention for repair purposes. In this process, the heat exchanger 19 is placed in an opening jaw 34 and clamped therein. By means of the lever tool 36 the edge area 5 of the plate 2 may then be bent upward until it contacts the edge 35. The water box 1 may then be lifted off, and the heat exchanger can be repaired. After this, the heat exchanger may again be closed by the closing device of the invention.

What is claimed is:

1. A method for clamping together heat exchanger parts, namely, a plastic water box having a flange thereon and a sheet metal end plate which accepts a bundle of tubes for the heat exchanger, the flange having an upper surface facing away from the sheet metal end plate, a lower surface facing toward the sheet metal end plate, an outer surface extending between said upper and lower surfaces and facing toward the exterior of the plastic water box, and an inner surface opposite to the outer surface and facing toward the interior of the plastic water box, the lower surface of the flange having a certain area, the sheet metal end plate having a groove therein for receiving said flange, the groove having a bottom, the groove being defined by a continuous, straight deformable outer edge, an inner side disposed inwardly of the outer edge in opposed relationship thereto, and an underside which extends perpendicularly between the inner side and outer edge, the underside defining the bottom of the groove, the method comprising the steps of:
    (a) placing a deformable seal on the bottom of the groove of the sheet metal end plate;
    (b) thereafter placing the flange of the plastic water box on the deformable seal which is in the sheet metal end plate and thereby guiding the flange into the groove so that the inner and outer surfaces of the flange are in mating relation with the inner side and outer edge of the sheet metal end plate, respectively;
    (c) thereafter clamping the plastic water box and sheet metal end plate together while deforming the seal until the seal approximately fills a space defined by the lower surface of the flange and the inner side, the outer edge and the bottom of the groove of the sheet metal end plate, whereupon the outer edge will then have a vertically upright standing area extending beyond the upper surface of the flange; and
    (d) deforming certain parts of the vertically upright standing area of the sheet metal end plate by vertically moving a deforming tool into engagement with the certain parts of said area to roll the certain parts over the upper surface of the flange into generally horizontal positions while leaving other parts of such area generally in their vertically upright condition to thereby form the outer edge into an approximately corrugated form to hold the plastic water box and sheet metal end plate together in a clamped condition.

* * * * *